United States Patent [19]

van der Gaag

[11] 4,079,355
[45] Mar. 14, 1978

[54] METHOD FOR THE TRANSMISSION OF BINARY INFORMATION BY MEANS OF A FREQUENCY-MODULATED SIGNAL AND A CIRCUIT FOR PERFORMING THAT METHOD

[75] Inventor: Hendrik van der Gaag, Eindhoven, Netherlands

[73] Assignee: U.S. Philips Corporation, New York, N.Y.

[21] Appl. No.: 668,488

[22] Filed: Mar. 19, 1976

[30] Foreign Application Priority Data

Apr. 18, 1975 Netherlands ................ 7504617

[51] Int. Cl.² .......................................... H04Q 9/12
[52] U.S. Cl. .......................... 340/148; 340/147 PC; 340/171 PF; 340/349
[58] Field of Search ............. 340/171 PF, 171 R, 148, 340/147 PC, 349; 325/30, 163, 320, 466; 307/271; 328/25, 28, 30

[56] References Cited

U.S. PATENT DOCUMENTS

| 3,798,601 | 3/1974 | Hulsbosch et al. ............ 340/171 PF |
| 3,835,454 | 9/1974 | Palmieri et al. ................ 340/171 R |
| 3,893,074 | 7/1975 | Mogi et al. .................... 340/171 PF |
| 3,924,065 | 12/1975 | Freeny, Jr. ......................... 325/30 X |
| 3,953,832 | 4/1976 | Streckenbach .................. 340/171 R |
| 3,973,241 | 8/1976 | Streckenbach et al. ......... 340/167 R |
| 4,005,428 | 1/1977 | Graham ............................... 325/64 |
| 4,019,142 | 4/1977 | Wycoff .......................... 340/171 PF |

Primary Examiner—Donald J. Yusko
Attorney, Agent, or Firm—Frank R. Trifari; Henry I. Steckler

[57] ABSTRACT

A transmission of a binary signal which transmission is immune to interference is obtained by transmitting the bits of the binary signal by means of a frequency-modulated signal in which a cycles of a first frequency $f_1$ are followed by b cycles of a second frequency $f_2$ for a binary zero value and b cycles of the first frequency $f_1$ are followed by a cycles of the second frequency $f_2$ for a binary one value.

14 Claims, 4 Drawing Figures

METHOD FOR THE TRANSMISSION OF BINARY INFORMATION BY MEANS OF A FREQUENCY-MODULATED SIGNAL AND A CIRCUIT FOR PERFORMING THAT METHOD

The invention relates to a method for transmitting binary information by means of a frequency-modulated signal.

From "Communicatie in informatieverwerkende systemen", De Fremery, Centrex, 1965, pp. 108 – 111 it is known that such a method in which a zero is transmitted with a first frequency and a one with a second frequency guarantees a good noise immunity of the binary information transmission.

In this method it is difficult to distinguish between a number of sequentially transmitted binary information units of the same sort.

It is an object of the invention to eliminate this disadvantage.

A method of the kind mentioned in the preamble according to the invention is therefore characterized in that one of the possible binary information units corresponds with a frequency-modulated signal which has, for a given first number of cycles $a_1$ a first frequency $f_1$ and thereafter, for a given second number of cycles $b_1$ a second frequency $f_2$ whilst the other possible binary information unit corresponds with a frequency-modulated signal which first has, for a first number of $b_2$ cycles the first frequency $f_1$ and thereafter, for a fourth number of $a_2$ cycles the second frequency $f_2$ where $(a_1-b_1)$ is unequal to $(b_2-a_2)$.

With this method a plurality of mutually equal binary information units which are to be transmitted in succession, can be clearly distinguished from one another after the transmission because a change in frequency occurs at the beginning of and during the transmission of each unit.

By a favourable choice of the number of cycles that the change in frequency from the first to the second frequency is situated from the beginning and the end of the transmission of a binary information unit the distinction between the transmission of a zero or a one can be made as large as possible so that the influence of interferences becomes particularly small.

The invention furthermore relates to a circuit for performing such a method, which is characterized in that it comprises a frequency converter which can be controlled by a control circuit, to an input of which control circuit the binary information $i$ to be transmitted is supplied whilst a plurality of further inputs of the control circuit are coupled with a plurality of corresponding outputs, $a$, $b$ and $(a + b)$ of a counter circuit, a counting input of which is coupled with an output of the frequency converter, This circuit enables construction of a transmitter in integrated circuit technique.

A further circuit for performing an abovementioned method according to the invention is characterized in that it comprises a frequency separator circuit for obtaining signals of the first frequency $f_1$ and the second frequency $f_2$ from a transmitted signal at separate outputs of that frequency separating circuit, whose outputs are each coupled with a corresponding input of a counter-and comparison circuit which counter- and comparison circuit has an output for taking-off binary information whilst a detection circuit is coupled with at least one of the said outputs of the frequency separating circuit for detecting a transition of the occurrence of a signal of the second frequency to the occurrence of a signal of the first frequency, a reset input of the counter- and comparison circuit being coupled with an output of this detection circuit.

When a detection circuit is used for the beginning of each modulated binary information unit with which the counter- and comparison circuit is also reset to zero a receiver having this circuit need not comprise a separate synchronization device. Detecting the beginning of each binary information unit is possible here in a very simple manner because it is always accompanied by the same change in frequency from the second to the first frequency.

The invention will now be explained in detail with reference to the drawing in which.

Figure 1:
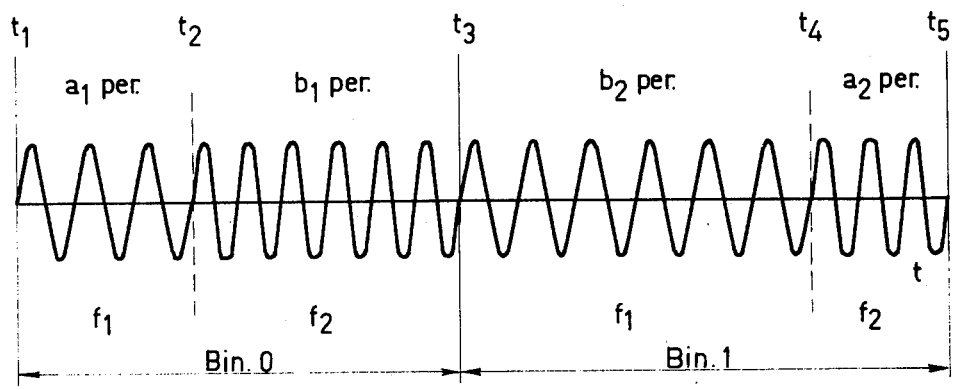
FIG. 1 shows diagrammatically the composition of frequency-modulated binary information units obtained with the method according to the invention.

In FIG. 1 a frequency-modulated signal shows from an instant $t_1$ to an instant $t_2$ a first frequency $f_1$ for $a_1$ cycles and from the instant $t_2$ to an instant $t_3$ a second frequency $f_2$ for $b_1$ cycles. The signal between the instants $t_1$ and $t_3$ serves to enable the transmission of the binary information unit, for example a zero. For the other binary information unit, in this case a one, the frequency-modulated signal has again the first frequency $f_1$ from an instant $t_3$ to an instant $t_4$ but now for $b_2$ cycles and then from the instant $t_4$ to an instant $t_5$ the second frequency $f_2$ for $a_2$ cycles where $(a_1-b_1) \neq (b_2-a_2)$ A favourable choice of $a_1$, $b_1$, $a_2$ and $b_2$ is $a_1 = a_2 = a$ and $b_1 = b_2 = b$ and a favourable ratio between $a$ and $b$ is a factor which is approximately two. For a remote control system with ultra-sound transmission for example $a \simeq 30$ and $b \simeq 70$ may be chosen. Because only two frequencies are used the band width which the signals occupies need not be much larger than when a zero would be transmitted by the one frequency and a one by the other frequency. No synchronization frequency is necessary to enable a distinction between a succession of equal binary information units, for example ones in the case of successive units, because each unit starts with a same change of frequency which is easy to detect.

Figure 2:
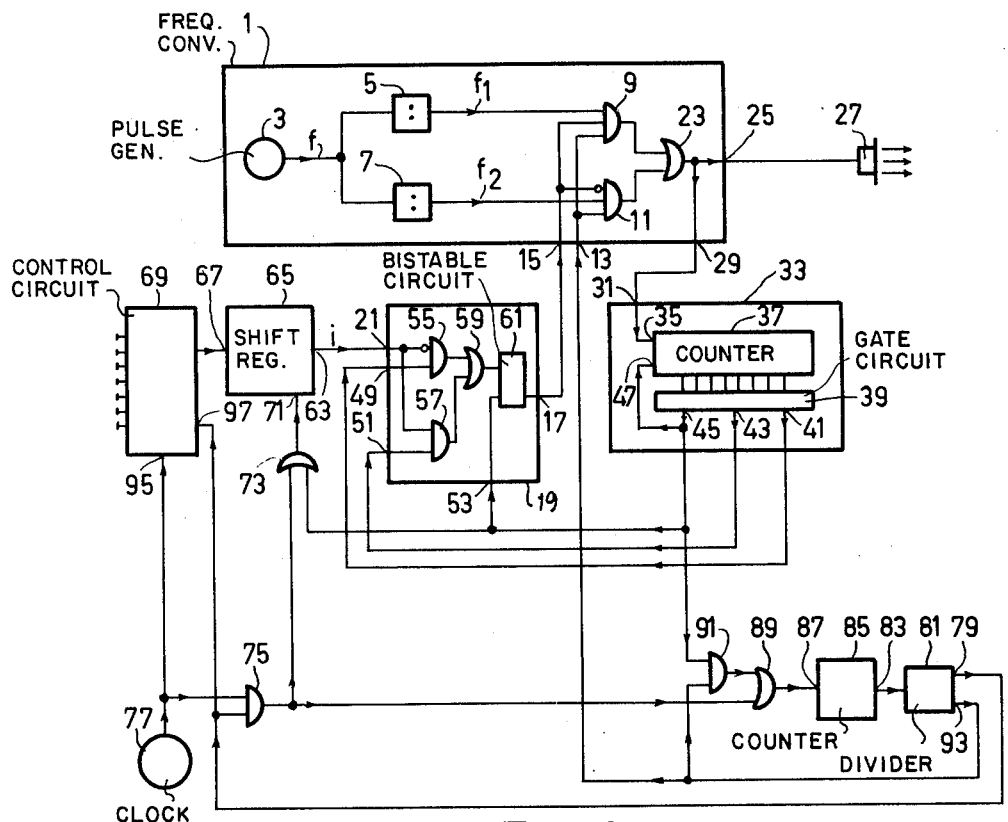
FIG. 2 shows an embodiment of a circuit for a transmitter to be used for performing a method according to the invention.

In FIG. 2 a frequency convertor 1 has a pulse generator 3 which generates a signal having a frequency $f$. Two binary scalers 5, 7 which deliver pulse signals of the first frequency $f_1$ and the second frequency $f_2$ respectively to two AND-gates 9 and 11 respectively are coupled with an output of the generator 3.

Furthermore the AND-gates 9 and 11 each have an input which is connected to a pause signal input 13 so that during the occurrence of signal pauses no signal can be transmitted through these gates. For the time this pause signal input 13 is kept at a logic onelevel, called a high potential hereinafter, one of the gates 9 and 11 passes the signal $f_1$ or $f_2$ respectively. The gates 9 and 11 are controlled by a signal derived from an input 15 of the frequency converter device 1. This input 15 is directly connected to an input of the gate 9 and to an input of the gate 11 through an inverter. Input 15 is connected to an output 17 of a control circuit 19 which dictates the sequence in which the gates 9 and 11 must conduct depending on a binary signal i supplied to an input 21 of control circuit 19.

If one of the gates 9 or 11, conducts a pulse signal having a frequency $f_1$ or $f_2$ is passed on through an OR-gate 23 to an output 25 to which converter 27 is connected which converts these frequency-modulated signal supplied to an acoustical signal. The band width of such a converter is small so that a substantially sinusoidal signal is transmitted. If it is desired to avoid phase jumps in the signal to be supplied to the converter 27 the frequency converter device 1 may be provided with a frequency divider having a switchable divider.

Furthermore the frequency converter device 1 has an output 29 which is connected to the output of the OR-gate 23 so that the signal to be transmitted is also supplied to an input 31 of a counting circuit 33 connected thereto. The input 31 of the counting circuit 33 is connected to a counting input 35 of counter 37. Connected to a plurality of outputs of the counter 37 is a gate circuit 39 which has three outputs 41, 43, 45 which are also the outputs of the counting circuit 33 and at which each time after the appearance of $a$, $b$ or $(a + b)$ pulses to be counted, a pulse occurs at the input 35 of the counter 37 which pulse will hereinafter also be called the signal $a$ or $b$ respectively or $(a + b)$. The reset input 47 of the counter 37 receives a pulse from the output 45 after every $(a + b)$ pulses which causes the counter to be reset.

The outputs 41, 43, 45 of the counting circuit are each connected to three inputs 49 or 51, 53 respectively of the control circuit 19. The input 21 of the control circuit 19 at which the signal $i$ occurs is connected to an input of an AND-gate 55 through an inverter, a further input of this AND-gate 55 being connected to the input 49 of the control circuit 19 at which the signal a occurs. The input 51 is connected to an input of an AND-gate 57, whilst a further input of the AND-gate 57 receives the signal $i$ from the input 21. The AND-gate 55 supplies a signal $ai'$ to an input of an OR-gate 59. The AND-gate 57 supplies a signal $bi$ to another input of the OR-gate 59 so that, at an input of the OR-gate 59 a signal $ai' + bi$ occurs which is supplied to a reset input of a bistable trigger circuit 61, a setting input of which is connected to the input 53 of control circuit 19 and which receives the signal $(a + b)$. An output of the bistable trigger circuit 61 is connected to the output 17 of control circuit 19.

If the trigger circuit 61 is adjusted to the set state due to an $(a + b)$ signal at the input 53 then the output 17 is high and the AND-gate 9 of the frequency converter device 1 conducts. Through the gates 9 and 23 the counting circuit 33 then receives a signal having a frequency $f_1$. After $a$ cycles the output 41 of the counting circuit 33 supplies an $a$ signal which may adjust the trigger circuit 61 to the reset-state if the signal $i$ at the input 21 is low. If the signal $i$ at the input 21 is high then only a $b$ signal at the input 51 can adjust the trigger circuit 61 to the re-set state. If the trigger circuit 61 assumes the re-set state this causes gate 9 of the frequency convertor device 1 to stop conducting and gate 11 to start conducting so that a signal having a frequency $f_2$ occurs at the output of the OR-gate 23 until the counting circuit $(a + b)$ has counted pulses and the $(a + b)$ signal at the set signal input of the trigger circuit 61 adjusts it again to the set state. If the signal i at the input 21 of the control circuit 19 is low the frequency converter device 1 consequently delivers a signal at its output 25 which signal first has a frequency $f_1$ for $a$ cycles and thereafter a frequency $f_2$ for $b$ cycles. If the signal $i$ at the input 21 of the control circuit 19 is high then the signal at the output 25 of the frequency converting device 1 first has the frequency $f_1$ for $b$ cycles and thereafter the frequency $f_2$ for a cycles. The signal at the input 13 of the frequency converting device 1 is assumed to be high in all instances.

The binary signal $i$ is the signal which has to be transmitted. It is obtained from an output 63 of a shift register 65 which temporarily serves as storage device. This shift register 65 has an input 67 to which a binary signal is supplied which is derived from a control circuit 69 and has a shift control signal input 71 to which a shift control signal is supplied which is obtained from an output of an OR-gate 73.

An input of the OR-gate 73 is connected to the $(a + b)$ output 45 of the counter circuit 33 and an input is connected to an output of an AND-gate 75. The AND-gate 75 receives a signal from a clock generator 77 and a signal from an output 79 of a twoscaler 81.

From an output 83 of a counter 85 which counts to n, an input of the two-scaler 81 receives a signal each time $n$ pulses have occurred at a counting input 87 of this counter. The counting input 87 is connected to an output of an OR-gate 89, an input of which is connected to an output of an AND-gate 91 and another input to the output of the AND-gate 75. The AND-gate 91 has an input which is connected to the $(a + b)$ output 45 of the counting circuit 33 and an input which is connected to a further output of the two-scaler 81. This output 93 carries a signal which is the inverse of the signal at the output 79 of the two-scaler 81. The signal at the output 93 is also supplied to the pause signal input 13 of the frequency converter device 1.

In the above it was assumed that the signal at the input 13 of the frequency converter device 1 was high. Then the AND-gate 91 passes the $(a + b)$ signal when this is high. Then the AND-gate 75 is blocked so that only the $(a + b)$ signal is supplied to the OR-gate 73. Then the shift register 65 shifts each time a next bit of the information stored therein to its output 63 if the counting circuit 37 has counted $(a + b)$ cycles and consequently the output 25 of the frequency converter device 1 has again supplied a binary information unit as frequency-modulated signal to the converter 27.

If through the AND-gate 91 and the OR-gate 89 $n$ pulses of the $(a + b)$ signal have been supplied to the counting input of the counter 85 the latter supplies pulse at its output 83 which causes the two-scaler 81 change state so that its output 79 becomes high and its output 93 becomes low. Then the AND-gate 91 is blocked together with the AND-gates 9 and 11 of the frequency convertor device 1 so that no signal is supplied to the converter 27 any longer.

The AND-gate 75 now conducts so that a shift control signal derived from the clock generator 77 is supplied to the shift control signal input 71 of the registers 65 through the OR-gate 73. The clock generator 77 also supplies a clock signal to an input 95 of control circuit 69 which is made operative by a signal derived from the output 79 of the two-scaler 81 which signal is supplied to an input 97 of the control device 69. The shift register 65 is then filled with a new code word of $n$ bits because now the counter 85 after having received $n$ pulses through the AND-gate 75 and the OR-gate 89 again causes the two-scaler 81 to change state. Thereafter the new code words which are stored in the shift register 65 is converted again to a frequency-modulated signal which must be supplied to the converter 27.

To prevent that the shift register 65 is filled when no new code word is present in the control circuit 69, it is possible, when desired, to supply a signal from that control circuit to a further input (not shown) of the AND-gate 75 so that this gate 75 can only be rendered conducting if a new code word is present.

The circuit described above has the advantage that no clock signal is operative if during the transmission of a signal through the converter 27 and that the transmission rate is only determined by the frequency of the signal to be transmitted and the number of cycles this signal has occurred.

The control circuit 69 may comprise a known coding circuit which generates a code word to be transmitted and which, for example, depends on a function to be operated in an apparatus to be operated which is coupled with a receiver which receives the signal transmitted by the converter 27.

Figure 3:
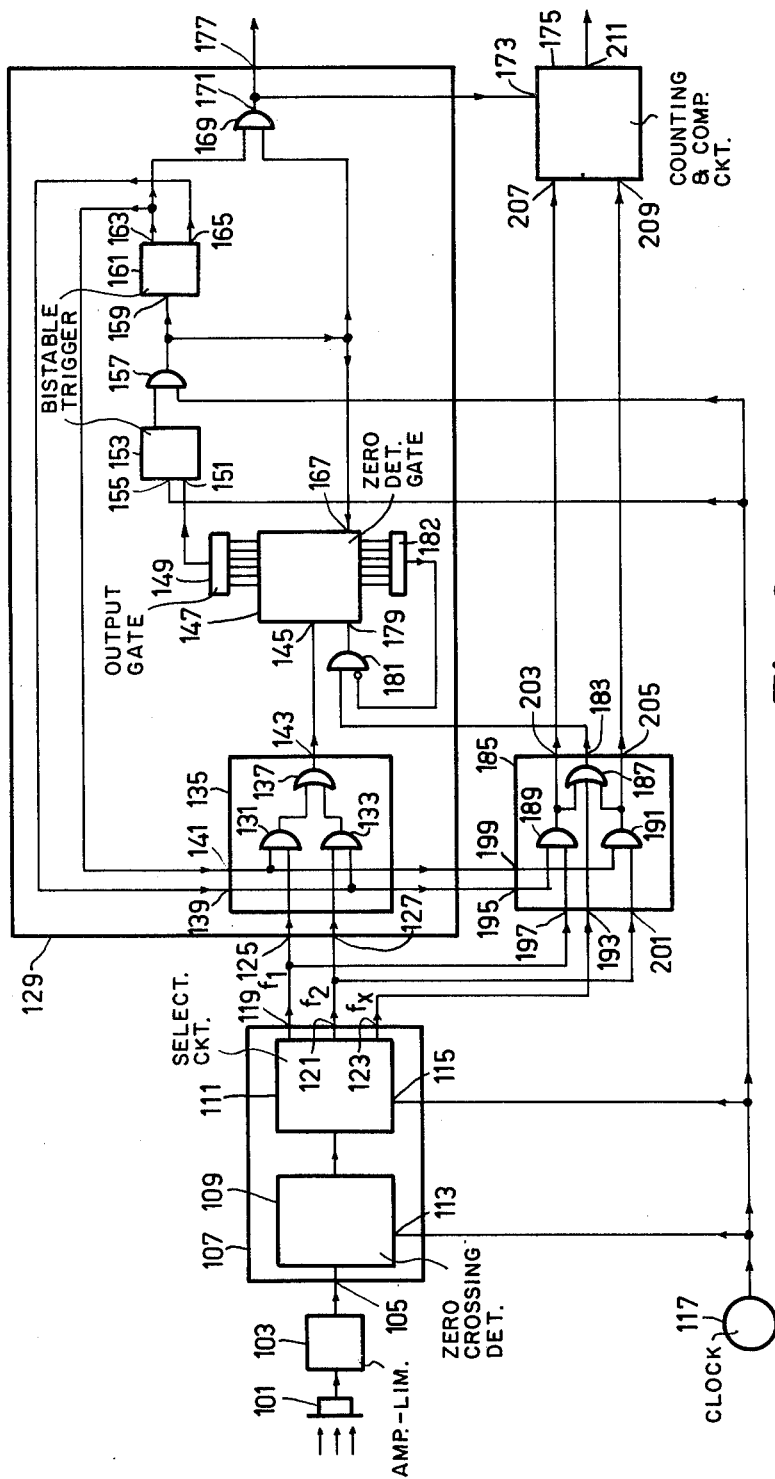
FIG. 3 shows an embodiment of a circuit for a receiver to be used for performing a method according to the invention.

Such a receiver is shown diagrammatically in FIG. 3. At its input it comprises a converter 101, in this case a microphone which is sensitive to ultra sound and which supplies a signal to an amplifier-and limiter circuit 103 which signal is converted to a pulse-shaped signal which is supplied to an input 105 of a frequency separating circuit 107.

The frequency separating circuit 107 comprises, in this sequence, a zero-crossing pulse shaper 109 and a selection circuit 111 which both have an input 113 or 115 respectively which are connected to an output of a clock generator 117. Consequently the zero-crossing pulse shaper 109 supplies each time that the signal at the input 105 changes from, for example, negative to positive a pulse to the selection circuit 111 which pulse coincides with the pulse cycles generated by the clock pulse generator 117.

The selection circuit 111 has three outputs 119, 121 and 123. A signal only appears at the output 119 if the input signal of the selection circuit has a frequency $f_1$, at the output 121 only is the frequency is $f_2$ and at the output 123 if that frequency is not equal to $f_1$ or $f_2$. The latter will be called $f_x$ hereinafter. The signals obtained from the outputs 119, 121 and 123 will also be called $f_1$, $f_2$ and $f_x$ hereinafter.

The signal $f_1$ and $f_2$ derived from the outputs 119, 121 are supplied to an input 125 or 127 respectively of a detection circuit 129. The input 125 is connected to an input of AND-gate 131 and the input 127 to an input of AND-gate 133 of a switch-over device 135 which also comprises an OR-gate 137 having two inputs. Each input is connected to an output of one of the AND-gates 131 and 133. The change-over device 135 also comprises two switch-over signal inputs 139 and 141 which are connected to a further input of the AND-gate 131 or 133 respectively and an output 143 which is connected to an output of the OR-gate 137. Mutually inverse signals are supplied to the switch-over signal inputs 139 and 141, so that either the signal $f_1$ or the signal $f_2$ is supplied by the output 143.

Let us assume that the signal at the output 143 of the switch-over device 135 has the frequency $f_2$.

Connected to the output 143 is an adder input 145 of a counter 147, an output gate circuit 149 of which supplies in the position p of the counter a pulse to a reset input 151 of a bistable trigger circuit 153. A clock signal derived from the clock signal generator 117 is applied to the trigger signal input 155 of this trigger circuit. When the counter 147 has arrived at the position p then the trigger circuit 153 will supply at the next clock signal pulse a positive signal to an AND-gate 157 which is connected to an output of the trigger circuit which signal lasts till the next clock signal pulse. The AND-gate 157 has a further input which is supplied with a clock pulse by the generator 117 so that during the occurrence of the clock signal pulse which is produced in the time the AND-gate 157 conducts a pulse is supplied to a trigger signal input 159 of a bistable trigger circuit 161 which is constructed as a two-scaler which input is connected to an output of the AND-gate 157 which causes the two-scaler 161 to change state.

The input 141 or 139 respectively of the change-over device 135 are connected to the mutually inverse output 163 and 165 of the two-scaler 161. So far the two-scaler 161 has caused the AND-gate 133 of the change-over device 135 to conduct. Because p pulses of the $f_2$ signal have been counted by the counter 147, the two-scaler 161 changes to the other state, as indicated above, and the AND-gate 131 starts conducting whilst the AND-gate 133 is blocked. At the same time the counter 147 is reset to zero because a reset input 167 thereof is connected to the output of the AND-gate 157 at which, as described above, a clock signal pulse has appeared after p pulses counted by the counter 147.

At this moment no $f_1$ signal is present at the input 125 of the detection circuit because a frequency change does not occur until after a or b pulses and because p has been chosen sufficiently small with respect to a and b, for example $p = 7$ when $a = 30$ and $b = 70$. When next the frequency changes from $f_2$ to $f_1$ the counter 147 will again count to p. Then the change of frequency has been detected and the two-scaler 161 will again change state. Consequently, after each detected frequency change from $f_2$ to $f_1$ a positive signal occurs at the output 163 of two-scaler 161 which signal remains present until the next detected frequency change from $f_1$ to $f_2$.

This signal is fed to an input of an AND-gate 169 which has a further input which is connected to the output of the AND-gate 157. This causes a single clock pulse to appear at an output 171 of the AND-gate 169 with each detected frequency change from $f_2$ to $f_1$ which pulse is supplied to a reset input 173 of a counting-and comparison circuit 175 and which may also be derived as clock pulse for further signal processing from an output 177 of the detecting circuit. As is stated in the discussion of FIG. 1 a frequency change from $f_2$ to $f_1$ represents the beginning of a binary information unit.

Furthermore, the counter 147 has a downcounting signal input 179 which is connected to an output of a AND-gate 181. An input of the AND-gate 181 receives an inverted signal from a gate circuit 182 with which the zero position of the counter 147 is detected. So the AND-gate 181 can only conduct if the counter 147 has a position which is unequal to zero. A signal derived from output 183 of a further change-over device 185 is supplied to a further input of the AND-gate 181. The output 183 is connected to an output of an OR-gate 187 to which an output signal of an AND-gate 189 and of an AND-gate 191 and a signal derived from an input 193 of the further change-over device 185 is supplied. An input of the AND-gate 189 is connected to an input 195 of the further change-over device 185 which is connected to the output 165 of the two-scaler 161 and another input is connected to an input 197. The inputs of the AND-gate 191 are connected to an input 199 of the further change-over device 185 which is connected to the output 163 of the two-scaler 161 or to an input 201 respectively.

The signal $f_1$ derived from the output 119 of the frequency separation switch 107 is supplied to the input 197 of the further change-over device 185, the signal $f_2$ derived from the output 121 to the input 201 and the signal $f_x$ derived from the output 123 to the input 193.

At the output 183 of the further change-over device 185 there now appears in the time that the $f_1$ signal input 125 of the change-over device 135 is connected to the adder input 145 of the counter 147 each $f_2$ or $f_x$ signal that might occur during that time, for example due to interferences, and which might make the detection of the said $f_1$ signal incorrect, Then the counter 147 decreases its position by the number of interfering $f_2$ or $f_x$ pulses which are received in the $f_1$ counting cycles and does not reach the position $p$ until the number of $f_1$ pulses received is sufficiently large. It will be obvious that this decrease of the counter position by means of interfering pulses may be dispensed with if so desired.

If, on the other hand the change-over device 135 is in such a position that the $f_2$ input 127 of the change-over device 135 is connected to the adder input 145 of the counter 147, each signal which in that time would show a frequency $f_1$ or $f_x$ and which might disturb the correct detection of the $f_2$ signal appears at the output 183 of the further change-over device 185.

The further change-over device 185 has also an output 203 which is connected to the output of the AND-gate 189 and an output 205 which is connected to the output of AND-gate 191. After the detection circuit 129 has detected a number of p pulses of the signal $f_1$ following on a frequency change from $f_2$ to $f_1$ at input 125, the signal $f_1$ occurs at the output 203 which signal supplied to an adder input 207 of the counting and comparison circuit 175. After the detection circuit 129 has detected p pulses of the $f_2$ signal at the input 127 which follow a change in frequency from $f_1$ to $f_2$ the signal $f_2$ appears at the output 205 which is supplied to a down-counting input 209 of the counting and comparison circuit 175.

As stated above the counting and comparison circuit 175 is reset to zero by the signal at its input 173 at each frequency change from $f_2$ to $f_1$ which is detected by the detection circuit 129. A signal supplied to the adder input 207 then causes its position to change to approximately $a-p$ or $b-p$ depending on the binary information unit to be identified. Herein the amount $-p$ is due to the fact that in the detection circuit at least p pulses have been used to obtain a detection of a frequency change.

If the counting and comparison circuit 175 first adds $(a-p)$ pulses $f_1$ signal together and thereafter $(b-p)$ pulses are subtracted then the final position of the circuit will be $(a-b)$ and in the case that $b \approx 70$ and $a \approx 30$ this will be approximately $-40$. Then a binary information unit 0 has been transmitted. If first $(b-p)$ pulses $f_1$ signal are added and then $(a-p)$ pulses $f_2$ signal are substracted, the final position of the circuit will be $(b-a)$ which in this case is approximately $+40$. The binary information unit transmitted is then a 1. If the difference between $a$ and $b$ is chosen sufficiently large so that, also when interferences occur no total is expected to be in the vicinity of zero then the sign of the total may be taken as indication and a sign signal of the counting and comparison circuit may be taken from an output 211 to obtain the transmitted binary information in binary form again.

It will be obvious that besides this simple comparison of the magnitudes $(a-b)$ and $(b-p)$ also other possibilities of comparison may be applied. For example, two separate counters may be used having comparison circuits which each have a permissible comparison value deviation.

Figure 4:
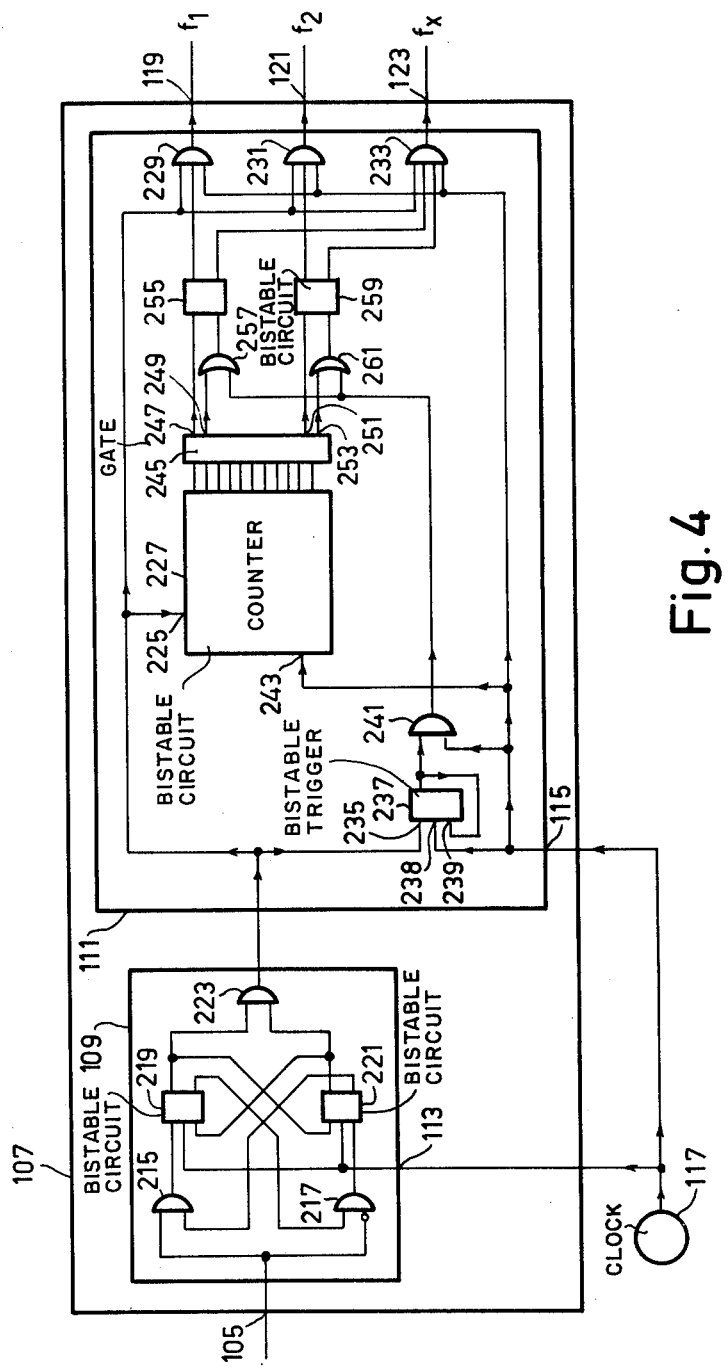
FIG. 4 shows a frequency separation circuit for a receiver according to FIG. 3.

For corresponding parts the same reference numerals have been used in FIG. 4 as in FIG. 3.

The frequency-modulated signal received and whose amplitude is limited is supplied to the input 105. The input 105 is connected to an input of an AND-gate 215 and to an inverting input of an AND-gate 217. An output of the AND-gate 215 is connected to a setting input of a first bistable trigger circuit 219 and an output of the AND-gate 217 is connected to a resetting input of a second bistable trigger circuit 211. A Q-signal output of the first trigger circuit 219 is connected to a setting input of the second trigger circuit 221. A Q-signal output of the second trigger circuit 229 is connected to resetting input of the first trigger circuit 219. A Q-signal output of the first trigger circuit 219 is connected to a further input of the AND-gate 217 and a Q-signal output of the second trigger circuit 221 is connected to a further input of the AND-gate 215. A trigger signal input of both the first and the second trigger circuit is connected to the clock signal input 113 of the zero-crossing pulse shaper 109. The output signal of the zero-crossing pulse shaper 109 is obtained from an AND-gate 233, an input of which is connected to the Q-signal output of the first 219 and an other input to the Q-signal output of the second 221 trigger circuit.

Let us assume that the signal at the input 105 changes from low to high and that the first and the second trigger circuit 219 and 221 are in the reset state. Then the AND-gate 215 conducts and the first trigger circuit 219 receives a second signal and is adjusted to the set state at the next clock pulse. As a consequence, the second trigger circuit 221 receives a setting signal and is adjusted to the set stage at the next clock pulse. As a result the AND-gate 215 is not rendered conducting and furthermore the first trigger circuit 219 receives a resetting signal from the second circuit 221. At the clock pulse which then follows the first trigger circuit 229 is reset. The second trigger circuit 221 receives a resetting signal from the AND-gate 217 when the signal at the input 105 changes from high to low. At the next clock pulse the second trigger circuit 221 is reset. The AND-gate 223 supplies a signal when the two trigger circuits 219 and 221 are in the set state. This is invariably the case in the second clock pulse cycle after a transition from low to high in the signal at the input 105.

In the selection circuit 111 the output signal of the zero-crossing pulse shaper 109 is supplied to reset input 225 of a counter 227, to three AND-gates 229, 231, 233 and to a setting-signal-input 235 of a bistable trigger circuit 237.

A trigger signal input 238 of the trigger circuit 237 is connected to the square-wave signal input 115 and a reset signal input 239 to a Q-signal output of the trigger circuit 237. This Q-signal output is also connected to an input of an AND-gate 241 another input of which is connected to the clock signal input 115. Consequently the AND-gate 241 supplies a clock pulse at its input which is delayed over a clock pulse cycle with respect to the zero-crossing pulse which is produced at the output of the AND-gate 223.

A counting signal input 243 receives a clockpulse signal from the input 115 of the counter 227. From the zero position which was obtained by the zero-crossing pulse the counter 227 counts each time the clock pulses entering thereafter. A gate circuit 245 which has four outputs 247, 249, 251, 253 is connected to an output circuit of the counter 227.

At the output 247 a pulse is produced each time the counter 227 assumes a position $n_1-k_1$, at the output 249 at the position $n_1+k_2$, at the output 251 at the position $n_2-k_3$ and at the output 253 at the position $n_2+k_4$. Here $n_1 = f/f_1$ where $f$ is the frequency of the clock signal and $f_1$ the above-mentioned first frequency and $n_2 = f/f_2$ where $f_2$ is the above-mentioned second frequency, whilst $k_1$, $k_2$, $k_3$ and $k_4$ are suitably chosen values which indicate in which frequency area $f_1$ and $f_2$ may be situated whilst noise signal pulses may be taken into account.

The signal at the output 247 of the gate circuit 245 is supplied to a set-signal input of a bistable trigger circuit 255, the signal at the output 249 to a reset-signal input of the trigger circuit 255 through an OR-gate 257, a further input of which is connected to the output of the AND-gate 241. Consequently the trigger circuit 255 is in the set state from the position $n_1-k_1$ of the counter 227 onwards till the position $n_1+k_2$ or till the next clock pulse after the zero-crossing pulse at the output of the AND-gate 223.

The signal at the ouput 251 of the gate circuit 245 is supplied to a set-signal input of a bistable trigger circuit 259, the signal at the output 253 to a reset- signal input of the trigger circuit 259 through an OR-gate 261 a further input of which is connected to the output of the AND-gate 241. Consequently, the trigger circuit is in the set state from the position $n_2-k_3$ of the counter 227 till the position $n_2+k_4$ or till the next clock pulse after the zero-crossing pulse at the output of the gate 223.

An input of the AND-gate 229 is connected to a Q-signal output of the trigger 255 and an input of the AND-gate 231 is connected to a Q-signal input of the trigger 259. The AND-gate 233 has an input which is connected to a Q-signal output of the trigger 255 and an input which is connected to a Q-signal output of a trigger 259. Furthermore, an input of the clock pulse signal input 115 is connected to the AND-gates 229, 231 and 233.

During the occurrence of the zero-crossing pulse at the output of the AND-gate 223 and the AND-gate 229 supplies a clock pulse to the output 119 if the frequency in the preceding period of the signal received by the change-over device 101 was $f_1$, the AND-gate 231 to its output 121 if the frequency was $f_2$ and the AND-gate 233 to its output 223 if the frequency had another value than $f_1$ or $f_2$.

The above-described circuits are eminently suitable for construction in integrated form. It will be obvious, that, if so desired also other circuits may be used for frequency shift, frequency selection, detection of frequency shift and so on, to perform a method according to the invention.

What is claimed is:

1. A method for transmitting binary information by means of a frequency-modulated signal, said method comprising transmitting one of the possible binary information units with a frequency-modulated signal which during a given first time duration extending for a first number of periods $a_1$ always continuously has a first frequency $f_1$ and which immediately thereafter during a given second time duration extending for a second number of periods $b_1$ always continuously has a frequency $f_2$, and immediately thereafter transmitting said one possible binary information unit or the other possible binary information unit with a frequency-modulated signal which first always continuously has during a third time duration extending for a third number of $b_2$ periods the first frequency $f_1$ and immediately thereafter during a fourth time duration extending for a fourth number of $a_2$ periods always continuously has the second frequency $f_2$, wherein $(a_1 - b_1)$ is unequal to $(b_2 - a_2)$.

2. A method as claimed in claim 1, wherein the first number $a_1$ and the fourth number $a_2$ are both substantially equal to $a$, and the second number $b_1$ and the third number $b_2$ are both substantially equal to $b$, where $b$ is unequal to $a$.

3. A method as claimed in claim 2 wherein one of the time durations $a$ and $b$ is substantially twice as large as the other.

4. A circuit for transmitting binary information by means of a frequency-modulated signal, said circuit comprising means for transmitting one of the possible binary information units with a frequency-modulated signal which during a given first time duration extending for a first number of periods $a_1$ always continuously has a first frequency $f_1$ and which immediately thereafter during a given second time duration extending for a second number of periods $b_1$ always continuously has a frequency $f_2$, and means for immediately thereafter transmitting said one possible binary information unit or the other possible binary information unit with a frequency-modulated signal which first always continuously has during a third time duration extending for a third number of $b_2$ periods the first frequency $f_1$ and immediately thereafter during a fourth time duration extending for a fourth number of $a_2$ periods always continously has the second frequency $f_2$, wherein $(a_1 - b_1)$ is unequal to $(b_2 - a_2)$.

5. A circuit as claimed in claim 4, wherein the first number $a_1$ and the fourth number $a_2$ are both substantially equal to $a$, and the second number $b_1$ and the third number $b_2$ are both substantially equal to $b$ where $b$ is unequal to $a$.

6. A circuit as claimed in claim 5, wherein one of the time durations extending for a number of periods $a$ and $b$ is substantially twice as large as the other.

7. A circuit as claimed in claim 4, wherein both of said transmitting means together comprise a frequency converter device having an output, a control circuit means for operating said converting device, said control circuit including an input means for receiving the binary information $i$ to be transmitted, and a plurality of further inputs, and a counting circuit having a plurality of output means coupled to said further inputs respectively and providing $a$, $b$, and $(a+b)$ signals respectively, and a counting input coupled to said output of the frequency converter device.

8. A circuit as claimed in claim 7, wherein the control circuit comprises a bistable trigger circuit having a setting and resetting inputs and an output, a gate circuit means for supplying a signal equal to $ai' + bi$ to the resetting input, the output of the control circuit being coupled with said output of the trigger circuit.

9. A remote control system comprising a circuit as claimed in claim 4.

10. A remote control system as claimed in claim 9, comprising an ultra-sound transmission system.

11. A circuit for receiving binary information transmitted as a frequency-modulated signal, wherein one of the possible binary information units is transmitted as a frequency-modulated signal which during a given first time duration extending for a first number of periods $a_1$ has a first frequency $f_1$ and which thereafter during a given second time duration extending for a second number of periods $b_1$ has a frequency $f_2$ and the other possible binary information unit is transmitted as a frequency modulated signal which first has during a third dime duration extending for a third number of $b_2$ periods the first frequency $f_1$ and thereafter during a fourth time duration extending for a fourth number of $a_2$ periods the second frequency $f_2$, wherein $(a_1 - b_2)$ is unequal to $(b_2 - a_2)$, said circuit comprising a frequency separating circuit having input means for receiving said transmitted signal and a pair of output means for respectively obtaining signals of the first frequency $f_1$ and the secondy frequency $f_2$ from said transmitted signal, a counting and comparison circuit having a pair of inputs coupled to said output means respectively, a resetting input, and an output means for supplying the transmitted binary information, and a detection circuit means coupled with at least one of the said outputs of the frequency separating circuit for detecting a change in the occurrence of a signal of the second frequency to the occurrence of a signal of the first frequency, said resetting input of the counting and comparison circuit being coupled with an output of this detection circuit.

12. A circuit as claimed in claim 11, wherein the detection circuit comprises a counter having a counting input and an output, a change-over device coupled between said counter and said separating circuit, said change over device having a control signal input, a two-scaler having an output coupled to said control signal input and an input coupled to said output of the counter of the detection circuit, the resetting input of the counting and comparison circuit being coupled to an output of the two-scaler.

13. A circuit as claimed in claim 12, wherein the frequency separating circuit includes a further output means for supplying signals of another than the first and the second frequency, the counter of the detection circuit having a down-counting input, and further comprising a further change-over device coupled between said further output means and said down counting input and having a control signal input coupled to an output of the two-scaler.

14. A circuit as claimed in claim 11, wherein the counting and comparison circuit comprises a two-way counter having a sign output means for supplying the transmitted binary information.

* * * * *

UNITED STATES PATENT AND TRADEMARK OFFICE
CERTIFICATE OF CORRECTION

PATENT NO. : 4,079,355
DATED : March 14, 1978
INVENTOR(S) : HENDRIK VAN DER GAAG It is certified that error appears in the above-identified patent and that said Letters Patent are hereby corrected as shown below:

<u>IN THE CLAIMS</u>

Claim 11, line 10, "dime" should read --time-- line 19, "condy" should read --cond--

Signed and Sealed this

Tenth Day of October 1978

[SEAL]

*Attest:*

RUTH C. MASON
*Attesting Officer*

DONALD W. BANNER
*Commissioner of Patents and Trademarks*